US006798953B1

(12) United States Patent
Cohen et al.

(10) Patent No.: US 6,798,953 B1
(45) Date of Patent: Sep. 28, 2004

(54) GUIDES LITHOGRAPHICALLY FABRICATED ON SEMICONDUCTOR DEVICES

(75) Inventors: Mitchell S. Cohen, Yorktown Heights, NY (US); Michael J. Cordes, Newburgh, NY (US); Steven A. Cordes, Cortlandt Manor, NY (US); William K. Hogan, Rochester, MN (US); Glen W. Johnson, Yorktown Heights, NY (US); Daniel M. Kuchta, Patterson, NY (US); Dianne L. Lacey, Mahopac, NY (US); James L. Speidell, Poughquag, NY (US); Jeannine M. Trewhella, Peekskill, NY (US); Joseph P. Zinter, Brewster, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/479,109

(22) Filed: Jan. 7, 2000

(51) Int. Cl.⁷ .................................................. G02B 6/30
(52) U.S. Cl. .............................. 385/49; 385/38; 257/98; 257/432
(58) Field of Search ............................. 385/31, 38, 39, 385/49, 51, 52, 88, 91, 92

(56) References Cited

U.S. PATENT DOCUMENTS 5,883,996 A * 3/1999 Knapp et al. .................. 385/88
6,151,430 A * 11/2000 Travers, Jr. et al. ........... 385/14
6,284,149 B1 * 9/2001 Li et al. ........................ 216/64

OTHER PUBLICATIONS

M.S. Cohen et al., "Low–Cost Fabrication of Optical Sub-assemblies," 1996 Electronic Components and Technology Conference, 1996, pp. 1093–1100.

C.A. Armiento, et al., "Gigabit Transmitter Array Modules on Silicon Waferboard," IEEE Transactions on Components, Hybrids, and Manufacturing Technology, vol. 15, No. 6, Dec. 1992, pp. 1072–1079.

K.A. Cooper, et al., "Flip Chip Equipment for High End Electro–Optical Modules," 1998 Electornic Components and Technology Conference, 1998, pp. 176–180.

J. Mohr, "LIGA—A Technology for Fabricating Microstructures and Microsystems," Sensors and Materials, vol. 10, No. 6, 1998, pp. 363–373.

H. Lorenz, et al., "High–aspect–ratio, ultrathick, negative–tone near–UV photoresist and its applications for MEMS," Sensors and Actuators A 64, 1998, pp. 33–39.

C.A. Burros, et al., "Small–Area High–Current–Density GaAs Elctroluminescent Diodes and a Method of Operation for Improved Degredation Characteristics," Applied Physics Letters, vol. 17, No. 3, 1970, pp. 97–99.

H. Lorenz et al., "Mechanical Characterization of a New High–Aspect–Ratio Near UV–Photoresist," Microelectronic Engineering 41/42, 1998, pp. 371–374.

MicroChem Corp., Newton, MA, USA, "Material Providing Process Data for SU–8".

* cited by examiner

Primary Examiner—Douglas Wille
(74) Attorney, Agent, or Firm—Ference & Associates (57) ABSTRACT

A structure that includes a substrate, typically a semiconductor chip such as a VCSEL or photodetector chip, and a guide for aligning a signal conveying device, typically an optical fiber, to a transducer such as an optoelectronic device on the semiconductor chip. The guide is formed, in a preferred embodiment, by lithographically exposing and developing a thick layer of photoresist. The structure is assembled by placing and securing the signal conveying device into a cavity-like region of the guide.

21 Claims, 8 Drawing Sheets

GUIDES LITHOGRAPHICALLY FABRICATED ON SEMICONDUCTOR DEVICES

FIELD OF THE INVENTION

The present invention relates to arrangements and methods for aligning a semiconductor transducer element, formed on a semiconductor chip or die, to a signal conveying element. An important category of the present invention relates to arrangements and methods for aligning an optical fiber to an optoelectronic device, such as a laser or photodetector formed on a semiconductor chip.

BACKGROUND OF THE INVENTION

Conventionally, a significant part of the cost of an optoelectronic package lies in the equipment and procedures employed to align an optical fiber to an optically active optoelectronic chip (such as a laser or photodetector). Since large numbers of these devices are manufactured yearly, efforts are constantly being made to reduce this cost.

In "Low-Cost Fabrication of Optical Subassemblies (M. S. Cohen et al., Proc. $46^{th}$ ECTC, pp. 1093–1100, 1996), there is disclosed a method of active alignment with powered-on devices in which special equipment is required and a lengthy sequential process is employed (i.e., one fiber aligned to one chip at a time): While the optoelectronic chip described in this reference is housed in an hermetically sealed metal and glass "TO can" enclosure, in principle the same method could also be used for a non-hermetically sealed chip.

In "Gigabit transmitter array modules on silicon waferboard" (A. Armiento et al., Proc. FEEE Trans. Comp. Hybrids and Manufacturing, vol. 15, pp. 1072–1080, 1992), there is disclosed a passive alignment technique using special mechanical locating features on the optoelectronic chip and the substrate wherein the chip is mechanically keyed to the substrate. This technique requires special processing of both the chip and the substrate. Here, the chip is not housed in a TO can.

In "Flip-chip equipment for high-end electro-optical modules" (K. S. Cooper et al., Proc. $48^{th}$ ECTC, pp. 176–180, 1998), there is disclosed a method of passive alignment using expensive special purpose and precision tooling, which also involves sequential processing. The alignment is carried out by matching fiducial marks on the chip and on the substrate. Here, the chip is not housed in a TO can.

All of the conventional methods described above are expensive to realize and thus add substantial cost to the package.

The general concept of using lithographic processing to create an on-chip fiber-guiding structure that enables alignment of a fiber to an optoelectronic device has been contemplated previously. As previously contemplated, such a concept offered a way of overcoming the difficulties associated with the types of conventional alignment methods described above. Particularly, in 1970, this concept was utilized to align a fiber to an LED (C. A. Burns and R W. Dawson, "Small-area high-current-density GaAs electroluminescent diodes and a method of operation for improved degradation characteristics", Appl. Phys. Lett., vol. 17, pp. 97–99, 1970). However, the fiber-aligning structure in question is a wet-etched well fabricated directly in the gallium arsenide (GaAs) substrate, which does not offer highly accurate fiber alignment because of the hemispherical shape of the well. In addition to many difficulties in controlling the etching process, the etching process itself results in a mechanical weakening of the fiber-aligning structure. Accordingly, a need has been recognized in connection with improving upon the deficiencies presented by this particular arrangement.

SUMMARY OF THE INVENTION

In accordance with at least one presently preferred embodiment of the present invention, fiber-to-chip alignment is achieved by employing lithographic tooling and processes which are commonly used in the semiconductor industry. Many of the processing steps are carried out in parallel on a wafer scale. The result is a significant cost savings in comparison with conventional arrangements such as those described heretofore.

The cost savings are achieved, at least in part, by way of the wafer-scale fabrication of fiber-guide structures directly on the optoelectronic device chips, lithographically, using standard semiconductor lithographic techniques. Each fiber-guide structure serves to guide a fiber into alignment with the optically active region of the chip. Since the fiber guides are lithographically patterned, excellent alignment with the optically active regions is assured. The present invention in accordance with at least one presently preferred embodiment, thus provides an inexpensive method of enabling passive alignment by use of standard lithographic tools instead of using any of the expensive procedures described above. After dicing the chips from the wafer, it is necessary only to insert the fibers into the fiber guides with the aid of simple fiber-handling tooling, and then to fix the fibers in place with a suitable adhesive.

Butt coupling from chip to fiber is one preferred manner of coupling the chips to the fibers; it avoids the use, and cost, of additional optical elements. Sufficiently high coupling efficiencies are achieved by maintaining short fiber-to-chip distances to reduce the extent to which a diverging optical beam expands before striking a receiving optical component.

Compared to the previously cited on-chip fiber-guiding structures that enable the alignment of a fiber to an optoelectronic device, the present invention offers very straight vertical walls by way of a straightforward, standard lithographic process, avoids the necessity of a chemical etch process directly in the semiconductor material, and provides precise alignment of the fiber to the optically active chip.

For a better understanding of the present invention, together with other and further features and advantages thereof, reference is made to the following description, taken in conjunction with the accompanying drawings. The scope of the invention will be expressed in the appended claims.

DETAILED DESCRIPTION OF THE PREFERRED EMBODIMENTS

Figure 1A:
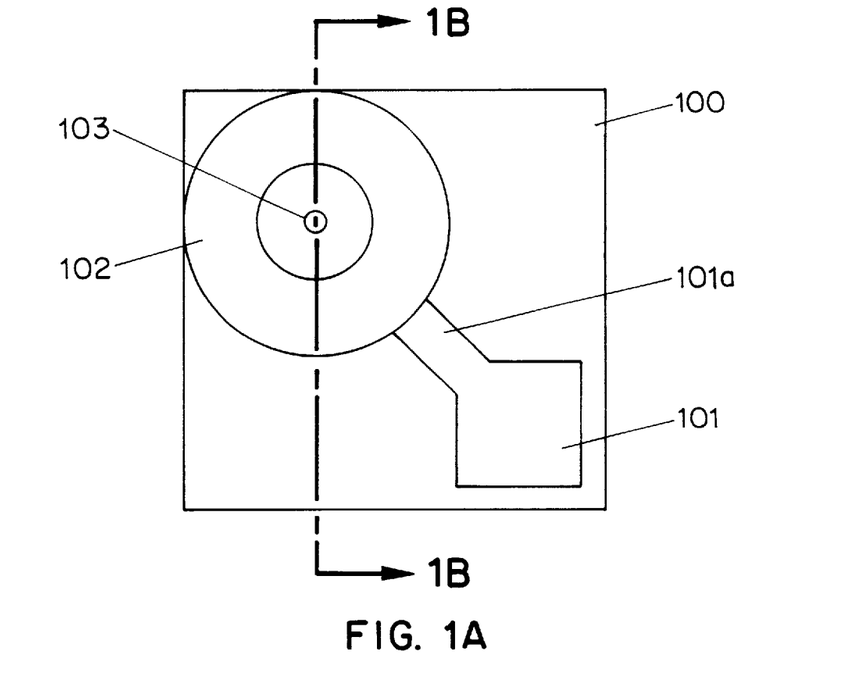
FIGS. 1A and 1B illustrate a plan view and side view, respectively, of a VCSEL (vertical-cavity surface-emitting laser) chip with an incorporated fiber guide structure.
Figure 1B:
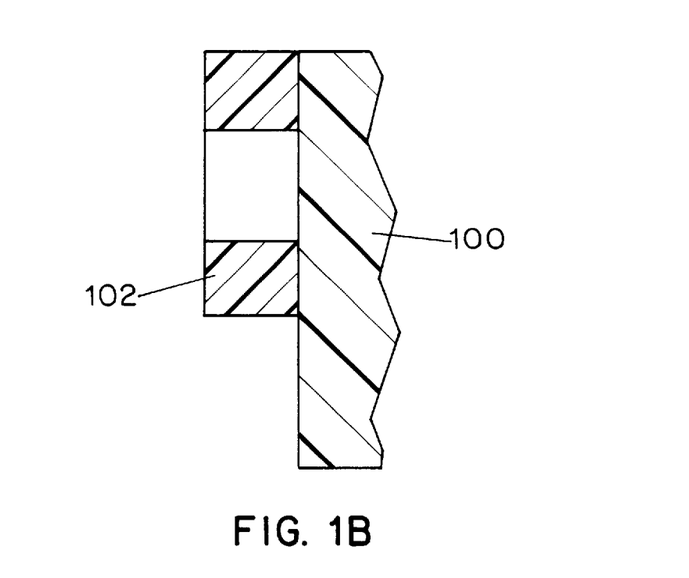

The layout of a VCSEL (vertical cavity surface-emitting laser) chip 100 with one possible embodiment of a fiber guide 102 is shown in FIG. 1A and 1B. Chip 100 will also typically include, as shown, a bonding pad 101 (for wire bonding) and associated conductive strip 101a as well as a narrow aperture 103 for emitting a laser beam. Such features will generally be well known to those of ordinary skill in the art and thus will not be described in further detail here.

For fiber guide 102, a bore fabricated using photolithographic techniques (described in more detail below) may preferably be used, and may be 125 microns ($\mu$m) in inside diameter and about 40 microns in height (i.e., the horizontal direction in FIG. 1B). Generally, any height within the range of 30–50 microns is acceptable. (Larger heights could, of course, be employed, but as pointed out below, it is advantageous to use the lowest practical height).

Care should be taken to insert the fiber into the bore of the fiber guide 102 in such a way that the fiber end never damages the optically active area of the chip. To achieve this, a gap of some 10–20 $\mu$m is preferably left between the fiber and the chip after completion of the insertion process. In this way, the delicate optically active region of the chip is protected from mechanical damage. This insertion procedure may be carried out, for example, with the use of a precision linear stage operated under computer control. In this connection, the fiber is first preferably lowered until the fiber end contacts the chip surface in a region safely away from the optically active region, thereby establishing a reference position, so that it can later be positioned with the required fiber-to-chip gap. The gap may be filled with a suitable transparent material. Such a material could, for example, be the adhesive which is used to anchor the fiber to the fiber guide upon completion of the fiber insertion step.

In an alternative method for achieving the same goal (FIG. 1C), a stop 104 is provided for the fiber so that the end face of the fiber does not hit the delicate surface of the chip. In this manner, the fiber stop 104, which contains a central hole smaller in diameter than the fiber, will essentially act as a shock absorber. Thus, a fiber entering the guide 102 would be stopped and at least part of it would rest on the annular "ledge" that serves as the transition between the fiber stop 104 and the rest of fiber guide 102. This fiber-stop 104, which could be. 10–20 microns thick, is preferably made by first spin coating a thin photoresist layer; this layer is exposed but not developed. The second, thicker photoresist layer (indicated at 106) is then applied over the first layer 104, exposed, and the entire structure is then simultaneously developed to result in the fiber guide structure 102 shown in FIG. 1C.

Figure 1C:
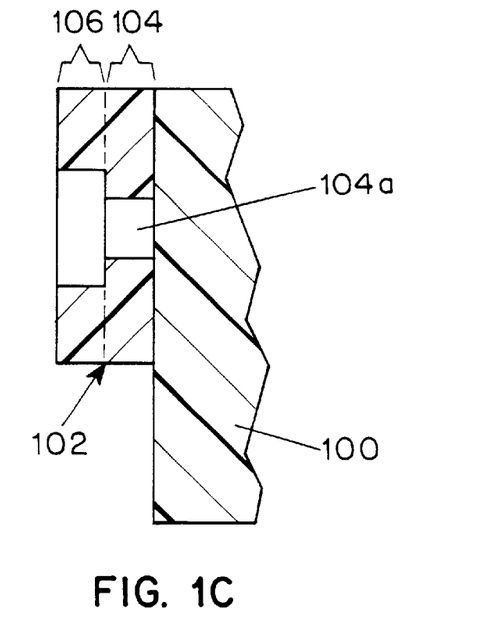
FIG. 1C illustrates a variation of the fiber guide structure which includes a fiber stop portion.
Figure 1D:
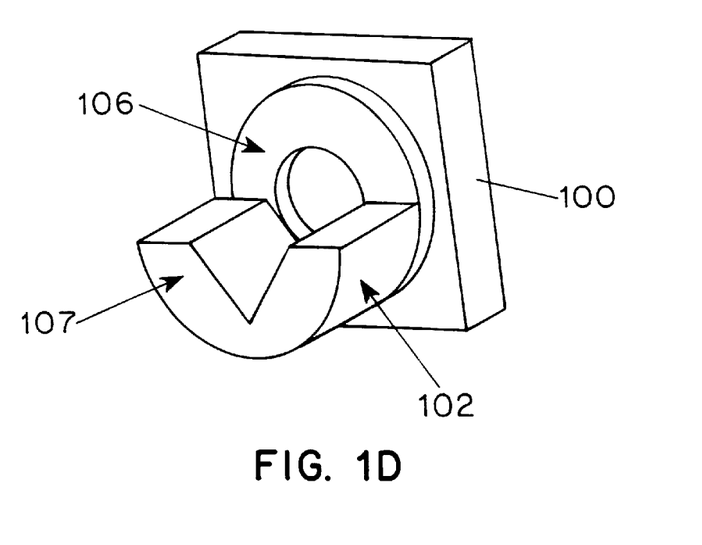
FIG. 1D illustrates a variation of the fiber guide structure with an under-constrained entry portion as a fiber lead in, thereby permitting fiber insertion by means of an initial lateral, rather than axial force.

A third possible embodiment of the fiber guide structure 102 would incorporate an under-constrained entry structure 107 as an outer component on a fully constrained fiber-guide structure component, wherein the fully constrained fiber-guide structure component would have the appearance illustrated in FIGS. 1A and 1B. This under-constrained entry portion could take the form of a V-groove. It would provide a self-aligning feature for the fiber, thereby loosening the lateral tolerances required for insertion of the fiber into the bore by the procedures described above, which could lead to significant cost savings. Initially, the fiber insertion tool would need only bring the fiber into the V-groove by means of a lateral force perpendicular to the V-groove bottom. The fiber would thereby be made to lie in the V-groove and be fully parallel to it. After the initial insertion step, the fiber can be inserted into the fully constrained fiber-guide structure component by application of a force perpendicular to the chip surface. The under-constrained entry structure component 107 can be combined with the fully constrained entry structure 106 to make the complete fiber guide as just described; alternatively, for better protection of the chip surface, the under-constrained entry structure component 107 can be combined with both the fully constrained entry structure component 106 and the fiber stop structure component 104 to make the complete fiber guide; alternatively the under-constrained entry structure 107 component can be combined with the fiber stop structure component 104 alone to make the complete fiber guide as illustrated in FIG. 1C. Furthermore, it is possible to make the complete fiber guide using the under-constrained entry structure 107 alone, directly fabricated on the optoelectronic chip; however in this case the very precise alignment offered by the fully constrained entry structure component would not be available.

In order to provide adequate mechanical stability for fiber inserted into the fiber-guide structure 102, the aspect ratio (height to width ratio) of the fiber-guide structure 102 must be adequate. Accordingly; the fiber guide 102 serves merely to keep the fiber aligned to the optically active chip until adhesive is applied and cured. Nonetheless, since the fiber is usually about 125 microns in diameter, the structure 102 should preferably be at least about 10 microns in thickness in order to maintain alignment successfully. Experiments have in fact shown that wall heights (or thicknesses) of 30–50 microns are more than adequate for this purpose.

The fiber-guide structure 102 will preferably have precisely determined bore diameters with straight, vertical walls. It is recognized, however, that this would be difficult to fabricate by way of ordinary lithographic measures. Thus, the present invention broadly contemplates, in accordance with at least one presently preferred embodiment, that special lithographic methods be employed in fabricating a fiber guide 102.

One conceivable way of accomplishing this task would involve the "LIGA" process (disclosed in J. Mohr, "LIGA, a technology for fabricating microstructures and microsystems", Sens. Mater. [Japan], v. 10, pp. 363–373, 1998): This method tends to be complicated, requires a synchrotron source of X rays, and involves electroplating. Alternatively, a material such as a metal could be deposited on the wafer, and bores could be etched in[]the deposited material by dry etching, i.e., reactive ion etching (RIE).; However, a much more attractive manner of accomplishing this goal is through the use of photoresists, i.e., by patterning the resist using standard photolithographic techniques and using the developed resist itself as the final structure. Such a process provides a simple, inexpensive, yet effective method of fabricating the desired fiber guides.

Unfortunately, the photoresists normally used in standard semiconductor fabrication are only a few microns thick and hence cannot generally offer the height-to-width aspect ratios which are required. There are, however, some specialized resists which can be used for this purpose. Such resists are, for example, THB-521 (positive resist) and THB-30LB (negative resist) both from the Japan Synthetic Rubber Co, Tokyo, Japan.

The photoresist called "SU-8" (MicroChem Corp., Newton Mass.) is of special interest, and may be utilized in accordance with at least one presently preferred embodiment of the present invention, because it permits fabrication of resist structures with straight vertical walls and high aspect ratios having values which can exceed 15 (see M. Despont et al., "High aspect ratio, ultrathick, negative-tone near-UV photoresist and its applications for MEMS", Sensors and Actuators, vol. A64, pp. 33–39). The SU-8, which is a negative resist (i.e., it "crosslinks" where light impinges) has the advantages of being an epoxy with high modulus and transparency at the wavelengths of interest, so that the patterned resist itself can be used with confidence as the desired fiber-guide structure. "Crosslink" is a term of art meaning that the monomers (relatively short organic molecules forming the pre-exposed form of the photoresist) link one to another (as a result of absorbing light during the lithographic exposure step) to form longer molecular structures which have much more durable mechanical and chemical properties (i.e. will resist chemical attack, will withstand mechanical forces) than the monomers.

To apply SU-8 photoresist in a process for fabricating fiber guides, it will preferably be spin coated, by conventional methods, on wafers (e.g., GaAs) containing a large array either of transmitters (VCSELs) or receivers (either PIN detectors, MSM [metal semiconductor-metal] detectors, or detectors integrated with a preamplifier). The fiber-guide structures are then preferably made by standard exposure and development procedures for the SU-8, wherein the usual mask-alignment techniques used in the semiconductor industry would insure that the SU-8 fiber bores are precisely aligned to the corresponding optically active regions on the wafers. After fabrication of the fiber-guide structures, the wafer is preferably diced, and each die is then preferably mounted in a transceiver package. The fibers of the transceiver are then preferably inserted into the bores of the fiber guide, and fixed in place with adhesive (see below).

Most applications require the light path, i.e., the fibers, to be parallel to the host board's surface. For this reason it may be assumed that the optoelectronic chip is mounted in the transceiver package by die bonding it to a submount or auxiliary sub-board, whereby the submount or sub-board is positioned so that its die-bonding surface is oriented perpendicular to the board surface in the transceiver package. A 90° bend in the electrical path between the submount and the host board must therefore be provided. Signals are fed to the chip by means of wire bonds to the submount, while the connection from submount or sub-board to the host board is made either by solder or flexible circuitry. For those applications where the light path could be perpendicular to the board surface, the 90° bend would be unnecessary.

The fiber is preferably bonded to the fiber guide by means of adhesive (e.g. epoxy) after insertion of the fiber into the guide. Use of a UV-crosslinkable adhesive is advantageous for this purpose because the crosslinking operation may be carried out very quickly.

This optical subassembly (OSA) mounting technique could be used for either the MTRJ or the LC small-form-factor optical connectors (for an explanation of the various small-form-factor fiber-optic connectors see "Performance comparison of small form factor fiber optic connectors", by J. M. Trewhella et al, Proc. 49th ECTC., pp.398–407, 1999), but is not limited to these connectors since mounting techniques involving other types of connectors are easily envisioned. For the MTRJ case, an MTRJ ferrule previously populated with two fibers could be fixed to the module, and the fibers would then be inserted into and bonded to the fiber guides associated with the transmitter optical subassembly (TOSA) and receiver optical subassembly (ROSA) chips.

Alternatively, a design for an LC optical connector could be realized by incorporating an LC fiber-to-fiber coupler in the module (transceiver package). On the module side of the coupler, fibers would first be inserted into split sleeves at their ferrule-terminated ends, then into the fiber guides of the optoelectronic chips at the bare-fiber ends.

It is further possible to use the fiber-guide scheme with ferruleless (bare fiber) connectors such as the currently available VF-45 from 3M Corp. In this case, the VCSEL or receiver chip would be positioned on a submount and would accept the bare fiber from a VF-45 connector using a fiber guide fabricated directly on the chip as described above. The step involving bonding the fiber permanently to the fiber guide would of course be omitted since in this configuration the fiber would have to be allowed to be removed and remated repeatedly. A thick fiber stop may be warranted in this case to cushion the active devices from the insertion force of a bare fiber connector, while a pronounced lead-in on the fiber guide may be advantageous to insure easy fiber insertion. An example of this fiber lead-in could be the under-constrained fiber guide that was previously described (FIG. IC).

Figure 2A:
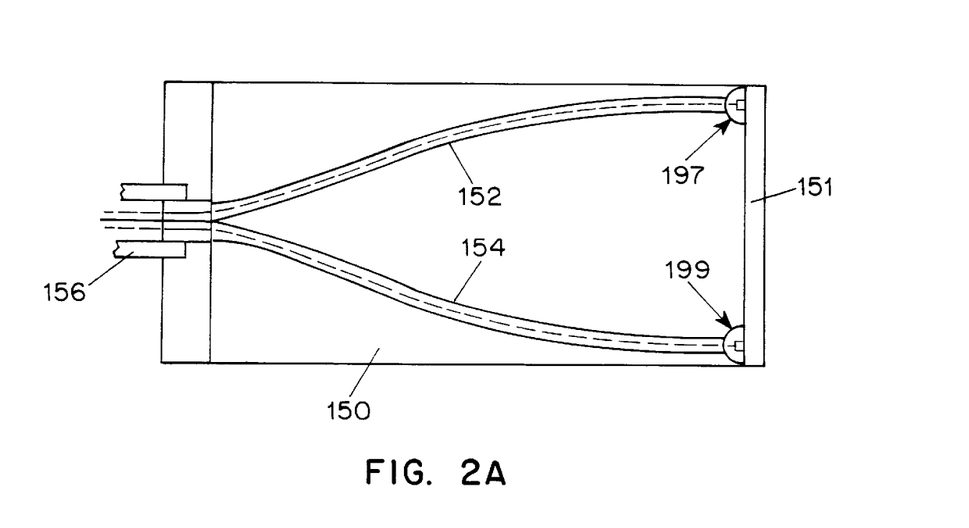
FIGS. 2A and 2B illustrate, respectively, a plan view of a transceiver layout with VCSEL and receiver chips having fiber guides and a close-up of a VCSEL chip and fiber guide.
Figure 2B:
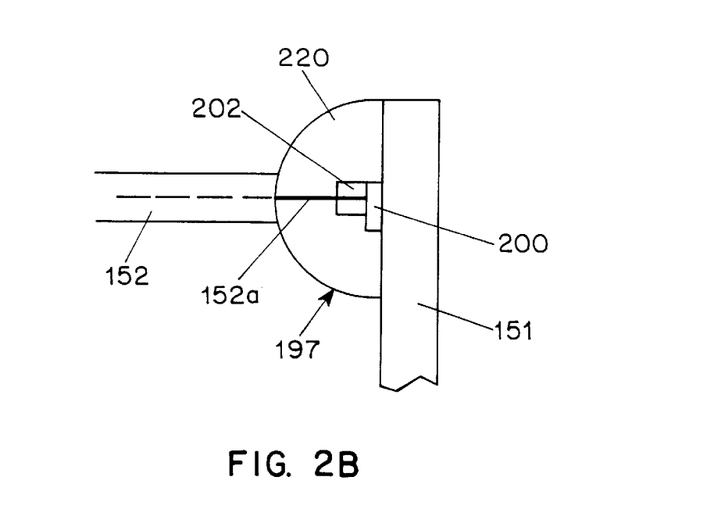

FIGS. 2A and 2B illustrate a possible application of fiber guides and associated structures in accordance with at least one presently preferred embodiment of the present invention. FIG. 2A, in particular, illustrates a transceiver layout with VCSEL and receiver chips having integrated fiber guides. As shown, a main board 150 supports a sub-board 151 oriented perpendicularly with respect thereto. Two fibers 152, 154, preferably emanate from an MTRJ connector 156. Since MTRJ connectors are believed to be well-known to those of ordinary skill in the art, they will not be described in further detail here.

Each fiber 152, 154, in turn, extends to an associated optoelectronic chip 197, 199. One such chip (e.g., 197) may be considered to be a transmitter, e.g., VCSEL, while the other (e.g., 199) may be considered to be a receiver. A clearer view of one such arrangement 197 (e.g., a transmitting arrangement) is shown in the enlargement constituted by FIG. 2B. Here, it will be seen that a VCSEL chip 200, mounted on subboard 151, has extending therefrom, and in a direction parallel to the plane of board 150, an optical fiber guide 202 which may be similar to the fiber guide 102 described and illustrated in FIGS. 1A and 1B. The end of the fiber 152a, from which the buffer has been stripped, is shown inserted into the fiber guide 202 which has been fabricated on the VCSEL chip. Preferably, a globule of suitable adhesive 220 may be applied once the fiber-end 152a is inserted (shown here as being hemispherical in shape). The adhesive 220 will preferably cover that portion of fiber-end 152a that would otherwise be exposed.

Figure 4:
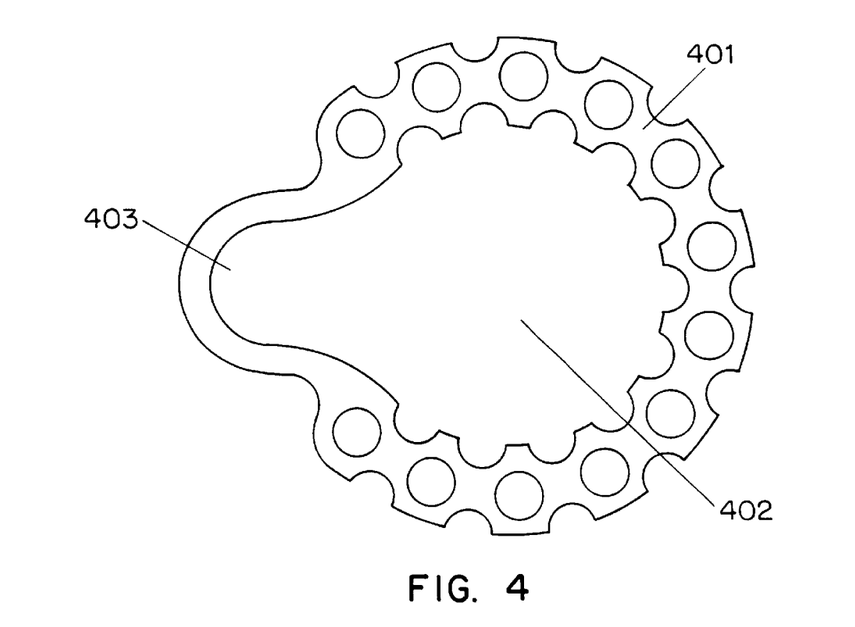
FIG. 4 is a plan schematic view of a guide, with relieved areas, having an initial target area and an aligned area.

Referring to FIG. 4, a fiber guide pattern 401 is depicted. This pattern has an initial target area 402 and an aligned area 403. The portion of the fiber guide pattern 401 surrounding substantially all the initial target area 402 is relieved to avoid stressing the underlying substrate on which the (optoelectronic) transducer (not shown) is fabricated. The semicircular portion of the fiber guide pattern 401 which partially surrounds aligned area 403 is designed to accept the optical fiber such that the optical fiber is precisely aligned to the transducer. It constrains the optical fiber until the optical fiber can be fixed in position.

Figure 5:
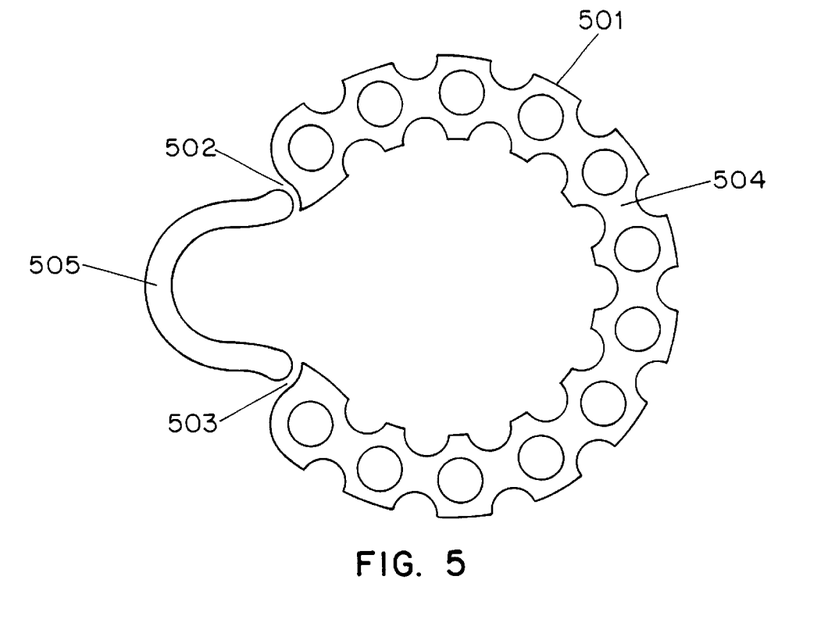
FIG. 5 is a plan schematic view of a guide, with relieved areas, having an initial target area separated from an aligned area.

In FIG. 5, a fiber guide pattern 501, similar to that of FIG. 4, is shown. The additional features included in this fiber guide pattern 501 are the gaps 502 and 503. These gaps help to further reduce any strain produced by fiber guide section 504 and induced upon the substrate, by separating the fiber guide section 504 from the sensitive portion at the center of the semicircular section 505.

Figure 6:
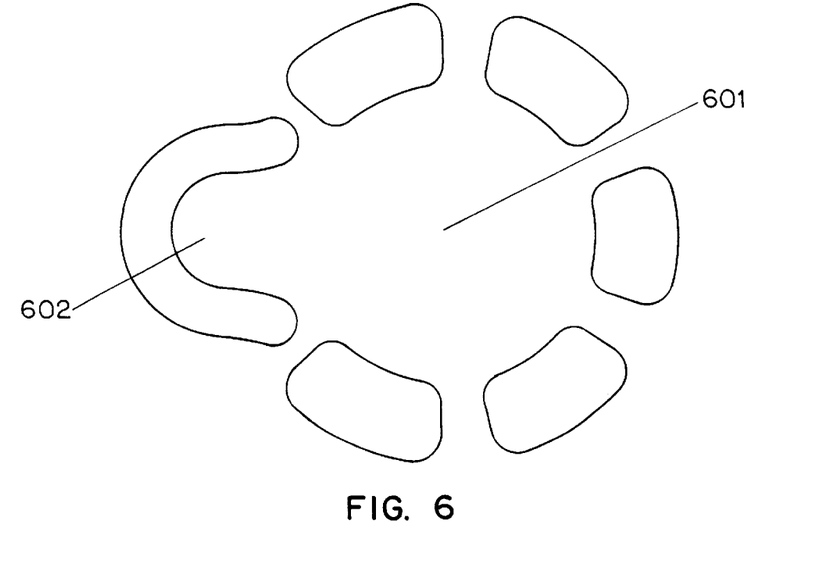
FIG. 6 is a plan schematic view of a guide with shaped segments having both an initial target area and an aligned area.

FIG. 6 is an illustration of a fiber guide pattern having segments, again to reduce induced strain, having a initial target area 601 and an aligned area 602.

Figure 7A:
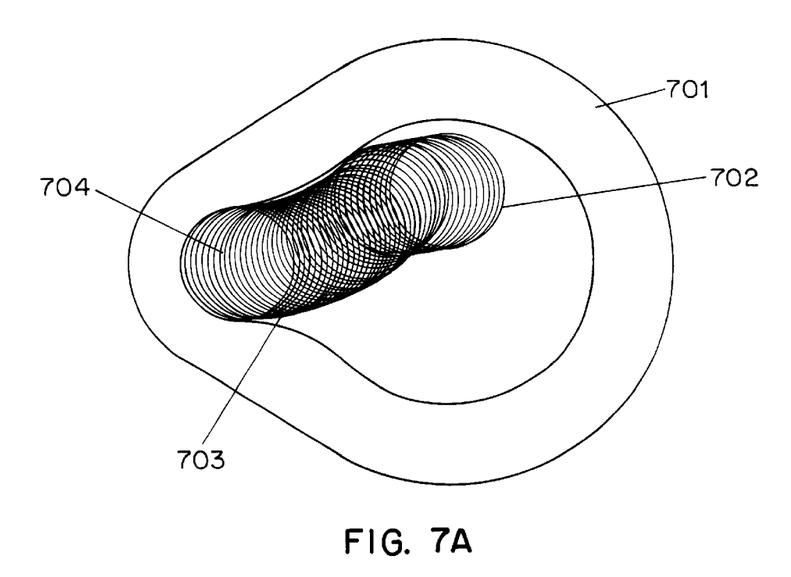
FIG. 7a is a plan schematic view of a guide having both an initial target area and an aligned area. The path of the end face of an optical fiber is depicted at regular time intervals, beginning at a starting position with the initial target area and ending in aligned position in the aligned area.

The fiber guide pattern 701 of FIG. 7a is a continuous structure and would be used in applications where induced strain is not significant. Also illustrated in FIG. 7a is the path of the end face of a fiber, starting at an arbitrary position 702, and ending at an aligned position 703, centered in its aligned area 704 (The aligned area 403 of FIG. 4 is the corresponding area of the fiber guide pattern.).

Figure 7B:
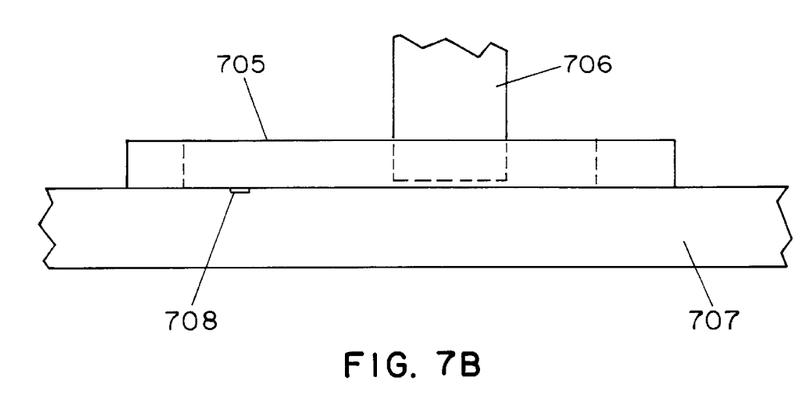
FIG. 7b is a cross-sectional schematic view of a guide showing one end of an optical fiber at a starting position within the initial target area. The relative sizes of the optical fiber, the height of the guide and the lateral size of the optoelectronic transducer are shown.

Referring now to FIG. 7b, a side view 705 of fiber guide pattern 701 is depicted along with the optical fiber 706 at a position corresponding to the arbitrary starting position 702 of FIG. 7a. Also shown is the substrate and the position of the transducer 708.

Figure 8:
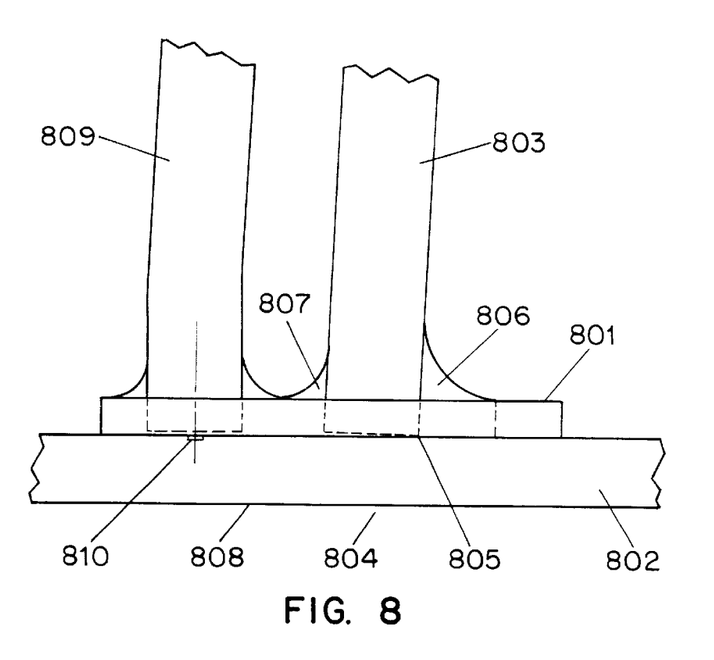
FIG. 8 is a cross-sectional schematic view of a guide showing one end of a tilted optical fiber 1) at a starting position within the initial target area showing the trailing edge of the endface of the fiber in contact with the semiconductor's top surface, and 2) at an aligned position. Also depicted in the figure is a representation of the meniscus of a liquid which serves in part as a lubricant during the movement of the optical fiber from the initial position to the aligned position.

FIG. 8 is also a side view of a fiber guide pattern 801, disposed upon a substrate 802. A tilted optical fiber 803 is depicted at an arbitrary starting location 804 and in contact with substrate 802 at a point 805. Tilted optical fiber 803 is held by suitable fixturing, not shown, at a position well above the portion of the tilted optical fiber 803 shown. Also shown is meniscus 806, a schematic representation of a liquid 807, such as a UV cured adhesive, surrounding tilted optical fiber 803 and substantially contained within fiber guide pattern 801. After tilted optical fiber 803 in position 804 has been moved into the aligned position 808, guided by the walls of fiber guide pattern 801, it will come to rest in a position as depicted by aligned optical fiber 809. Upon coming to rest, the adhesive 807 would be cured.

Alternatively, the steps of alignment could be accomplished without an adhesive, but possibly with a small amount of lubricant or a passivating agent such as a silicone gel. After the tilted optical fiber 803 has reached its aligned position 808, a droplet of adhesive could be dispensed in the initial target area and at which time surface tension forces would contribute to drawing the liquid adhesive around the end face of aligned optical fiber 809. After curing the adhesive 807, aligned optical fiber 809 is effectively locked in its aligned position.

The reason for bringing tilted optical fiber 803 in contact with substrate 802 is to find the point of contact with the surface. This provides a means for establishing a starting position of tilted optical fiber 803 to substrate 802. The initial target area (FIG. 4, 402) is an area where contact can be established without damaging substrate 802, and well away from the damage-sensitive area of transducer 710. In one embodiment, tilted optical fiber 803 is drawn away slightly from the surface of substrate 802 before it is moved into its aligned position. In another embodiment, it is moved along the surface while nominally maintaining contact. Since the contact point trails the center of tilted optical fiber 803, any damage that might occur will still be far from transducer 810.

To assist in the movement of tilted optical fiber 803 for its starting position to its aligned position, the fiber may be vibrated.

Aligned optical fiber 809 need not be fixed in position such that its long axis is accurately oriented normal to the top surface of substrate 802 since very little loss in the transfer of optical power is incurred by, small angular misalignments.

Alternately, the end face of the optical fiber may be polished such that the normal to the end face surface is not parallel to the axis of the optical fiber. It is well known in the art of optical communications that light emitted from a laser source may be reflected back into the laser's cavity, disturbing the output intensity stability of the laser, and therefore its utility as a very high speed optical signal generator. It is also known in the art that one way of reducing the amount of light reflected back into the laser is to incorporate tilted surfaces that function to redirect reflected light away from the laser cavity. In a procedure similar to that described above, the optical fiber would be carefully oriented with respect to the fiber guiding pattern and brought down to the substrate, contacting the substrate at a point. As the optical fiber is moved into its aligned position, only the trailing edge of the endface would possibly remain in point contact with the substrate. This point of contact would at all times be sufficiently distant from the transducer site that damage to sensitive areas is avoided. After the optical fiber is fixed in position, its (entrance) end face would be disposed at an angle with respect to the top surface of the substrate.

In a similar fashion, the end face of the optical fiber may be prepared in other ways, such as polishing a curved surface or adding other optical elements to the end face (e.g. an optical filter, or a lens element, as described in the sales literature of Digital Optics Corporation, North Carolina). It should be understood that any number of optical elements, including elements having reflective surfaces, may be incorporated upon the end face of the optical fiber as long as there is some mechanical feature thereon which is disposed such that it engages corresponding guiding and/or locating features of the patterned guide.

Figure 9:
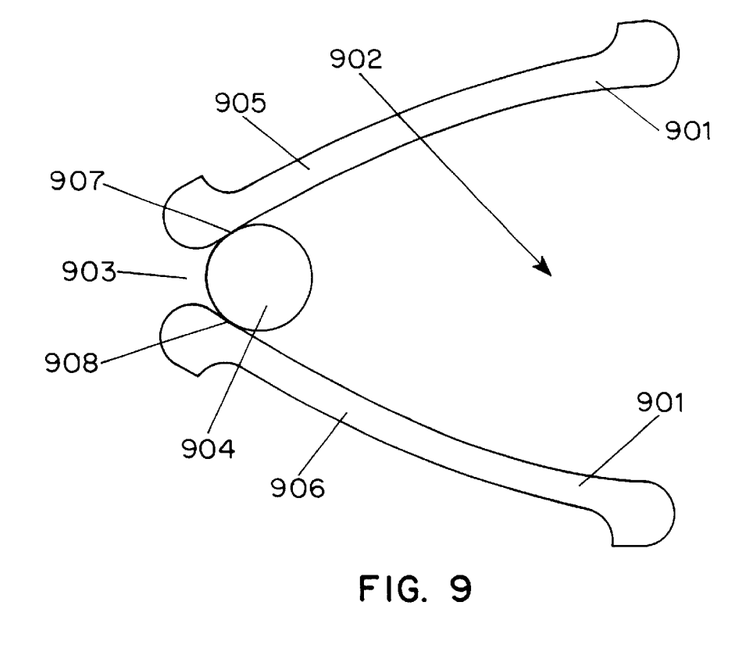
FIG. 9 is a plan schematic view of a guide which is open-ended in both the initial target area and aligned area. Also depicted is the optical fiber in its final aligned position, at which point the cylindrical side of the optical fiber contacts the guide's walls along two vertical lines.

While the present description has concentrated upon the placement of a single conveying element into a patterned guide, fixturing arrangements are also anticipated whereby multiple conveying elements are held in a fixture, where this fixture is moved into position such that the conveying elements are brought to the surface of the substrate in their respective initial target areas, and where the fixture, along with its multiple conveying elements, is moved in order to bring each of the conveying elements into their corresponding aligned areas, at which point the convey elements are fixed, as described above, in their aligned positions. FIG. 9 is a plan schematic view of chute shaped guide 901 wherein the initial target area 902 is not substantially completely enclosed. The aligned area has a gap 903. In its aligned position, endface 902 of the aligned optical fiber is in contact with the upper portion 905 and the lower portion 906 of chute-shaped guide 901 at points 907 and 908 respectively. With respect to the center of the optical fiber in its aligned position 904, the design contact points are carefully chosen, here drawn 120 degrees apart, to minimize the lateral error that the aligned fiber may have relative to the transducer, given that the location of the contact surfaces of upper portion 905 and lower portion 906 will shift slightly due to small, but normal, variations during fabrication.

Figure 10:
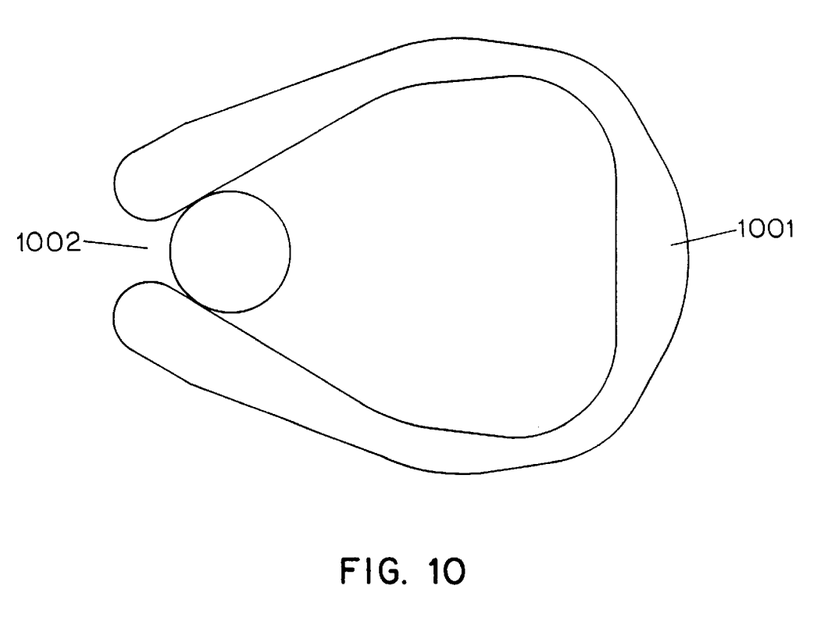
FIG. 10 is a plan schematic view of a guide having an enclosed initial target area and an open aligned area.

FIG. 10 is a plan schematic view of a fiber guide pattern 1001 and a gap 1002.

Since the presently conceived package is non-hermetic, potential corrosion effects are of concern. The surface of the chip may be coated with a thin protective polymer layer (preferably silicone gel, e.g. Wacker Semicosil 925). The function of this coating is to prevent corrosion of either the metallization or the semiconductor material. The use of such a protective layer may not be necessary if the semiconductor fabrication and subsequent passivation is inherently corrosion-proof.

Fabrication of the receiver optical subassembly is based on principles very similar to those just described for the VCSELs and is therefore need not be described in further detail here.

Several considerations influence the details of the design, fabrication, and use of the fiber guide structure.

The exposure and development procedures of the photoresist used must be carried out with care in order to obtain the desired bore diameters and wall profiles. The procedures required for the SU-8 resist have been well documented (see, e.g., product literature from Microchem Corp., Newton, Mass.). Using these procedures, bores could be fabricated with diameters within about a micron of the desired value. Such bores have vertical wall profiles and no detectable-resist residue in the bottom of the bore. Experiments have shown that bores which were only 1 or 2 microns larger in diameter than the fiber permitted full insertion of the fiber into the bore with a force of only a few grams of force.

It is well known that strain in the substrate wafer can occur during the SU-8 postbaking operation which is required after development (see H. Lorenz et. al, "Mechanical Characterization of a New High-Aspect-Ratio Near UV-Photoresist", Microelectronic Engineering, vol. 41/42, pp. 371–374, 1998). Such strains occur because of the high elasticity modulus of the SU-8 and the difference in thermal expansion coefficient between the SU-8 and the semiconductor. It is very important to minimize such strains here because of the strain sensitivity of optoelectronic devices. In particular, high strain could reduce the lifetime of VCSELs. However, several measures are preferably taken to reduce the strain, such as:

The thickness of the photoresist is minimized. As mentioned above, SU-8 fiber guides having heights of 30–50 microns are effective and produce much less strain than fiber guides of greater height.

Figure 3:
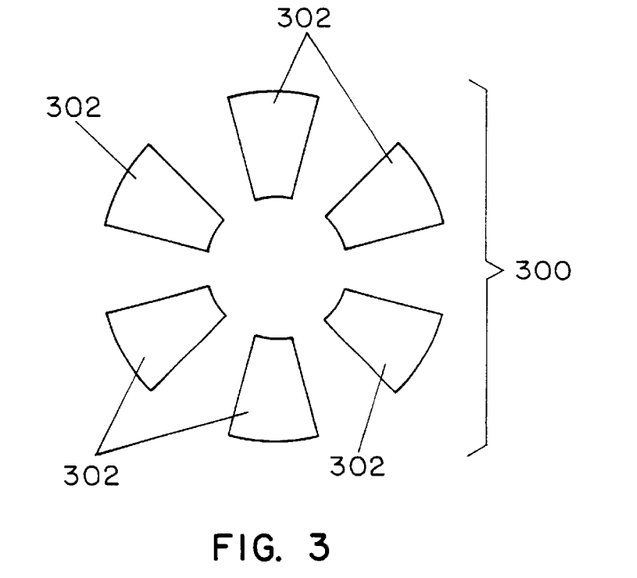
FIG. 3 is a plan schematic view of a fiber guide arrangement utilizing a number of discrete segments.

The fiber-guide structure is patterned so that the total area of the-structure is minimized. Such a structure 300 is shown in FIG. 3, where it is seen that small SU-8 segments 302 are employed instead of a continuous ring of material (while six segments 302 are shown in FIG. 3, it is to be understood that the number of segments employed is arbitrary, and can be as low as only 3 or 4 segments).—The fiber guide may also be constructed of a photoresist, e.g. SU-8 material, which is. specially formulated to have a low elasticity modulus. Such material can be produced by adding a softening or "flexibilizing" agent to the parent photoresist, such as those materials commercially available from Shell Chemical Co. or Union Carbide Co. Alternatively, a low-modulus material such as flexibilized photoresist could be used to make a thin underlayer between the fiber guide and the chip. The overlying guide region could then be made of the standard high-modulus material, so that the underlying low-modulus fiber-stop region relieves the strain. Since a transparent photoresist will be used, the light could pass directly through the low-modulus fiber-stop region. (Such a region but with a central hole is illustrated in FIGS. 1A and 1B).

While the description and claims herein concentrate on the optoelectronic applications, it is understood that the disclosed principles apply to non-optical applications wherein a transducer is accurately mated to a suitable signal conveying device. The present invention also broadly contemplates a context in which the semiconductor transducer is a small component mounted upon a silicon (semiconductor) bench substrate, or other substrate (i.e., ceramic) and the guide is aligned to the transducer but attached to the substrate.

Generally, at least one presently preferred embodiment of the present invention relates to arrangements and methods for aligning a semiconductor transducer element, formed on a semiconductor chip or die, to a signal conveying element. The semiconductor transducer element may be an optoelectronic device such as a laser or a photodetector, it may be, for example, a strain gauge. The signal conveying element may be an optical waveguide such as a gradient index optical fiber that delivers or accepts an optical signal, or it may be, as examples, a pin or probe for transferring mechanical vibrations, or one end of an electrical conductor that serves as an antenna for transferring a radio signal.

If not otherwise stated herein, it is to be assumed that all patents, patent applications, patent publications and other publications mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A structure comprising:

a semiconductor chip;

said semiconductor chip including an optoelectronically active portion; and a guide for aligning an optical fiber with espect to said optoelectroiiically active portion of said chip;

said guide having been formed directly on said semiconductor clip;

said guide comprising an entry portion and a transparent aument portion;

said entry portion being adapted to accept an optical fiber for being aligned with respect to said optoelectronically active portion;

said entity portion defining an opening;

said transparent abutment portion being disposed between said entry portion and said semiconductor chip;

said transparent abutment portion being adapted to abut an optical fiber and intercede between an abutting optical fiber and said semiconductor chip;

said transparent abutment portion comprising transparent material adapted to permit the throughput of light into an optical fiber adjacent said transparent abutment portion.

2. The structure according to claim 1, wherein said optoelectronically active portion is a laser.

3. The structure according to claim 2, wherein said laser is a VCSEL (vertical-cavity surface-emitting laser).

4. The structure according to claim 1 wherein the optoelectronically active portion of said chip is a semiconductor light-detector.

5. The structure according to claim 4 wherein the said semiconductor chip further comprises signal-processing functions.

6. The structure according to claim 1, wherein:

said chip has a planar surface; and said guide is adapted to align an optical fiber in a direction substantially perpendicular to the planar surface of said chip.

7. The structure according to claim 6, wherein said guide defines at least one interior wall that extends in a direction substantially perpendicular to the surface of said chip.

8. The structure according to claim 7, wherein said guide is formed from a photoresist material.

9. The structure according to claim 8, wherein said guide is formed from a photoresist material capable of providing substantially straight walls perpendicular to the substrate and having a high aspect ratio.

10. The structure according to claim 9, wherein said guide is formed from the photoresist material SU-8.

11. The structure according to claim 7, wherein:

said entry portion comprises an under-constrained entry portion and a fully constrained entry portion;

said under-constrained entry portion being adapted to accept an optical fiber so that the optical fiber is brought into alignment with said fully constrained entry portion;

said fully constrained entry portion being adapted to accept an optical fiber for alignment with respect to said optoelectronically active portion of said semiconductor chip;

said fully constrained entry portion defining a first opening;

said under-constrained entry portion defining a second opening;

said fully constrained entry portion being disposed between said under-constrained entry portion and said semiconductor chip.

12. The structure according to claim 1, wherein said guide is formed in segments.

13. The structure according to claim 11, wherein said under-constrained entry portion comprises a V-groove.

14. The structure according to claim 11, wherein said stop portion is disposed between said fully constrained entry portion and said semiconductor chip and is substantially transparent to light.

15. The structure according to claim 1, wherein:

said opening defined by said entry portion comprises a first opening;

said transparent abutment portion comprises a stop portion;

said stop portion defining a second opening;

said second opening defining a smaller two-dimensional cross-sectional area than said first opening.

16. The structure according to claim 1, wherein said stop portion is substantially annular in configuration.

17. The structure according to claim 1, wherein said transparent abutment portion comprises a transparent adhesive.

18. The structure according to claim 17, wherein said stop portion is substantially annular in configuration.

19. The structure according to claim 1, wherein said transparent abutment portion is mechanically compliant as compared to a remainder of said structure.

20. The structure according to claim 1, further comprising a transparent layer applied to at least one surface of said semiconductor chip, said transparent layer being contiguous with said transparent abutment portion and being adapted to hermetically protect at least one surface of said semiconductor chip.

21. A structure comprising:

a semiconductor chip;

said semiconductor chip including an optoelectronically active portion; and a guide having been formed directly on said semiconductor chip;

said guide comprising an alignment portion and a target portion, each of said alignment portion and said target portion defining at least one wall portion extending from said semiconductor chip, each said at least one wall portion being adapted to constrain lateral movement of an optical fiber with respect to said semiconductor chip;

said alignment portion being adapted to keep an optical fiber in alignment with respect to said optoelectronically active portion of said chip;

said target portion being adapted to accept and constrain an optical fiber prior to its being directed to said alignment portion;

said target portion defining an expanded general periphery in comparison with said alignment portion;

said target portion and said alignment portion being functionally contiguous as to permit the direction of an optical fiber from said alignment portion to said target portion.

* * * * *